United States Patent
Orlik et al.

(10) Patent No.: US 8,274,930 B2
(45) Date of Patent: Sep. 25, 2012

(54) ANALOG BEAMFORMING TO REDUCE INTERFERENCE IN WIMAX NETWORKS

(75) Inventors: Philip V. Orlik, Cambridge, MA (US); Toshiyuki Kuze, Kanagawa (JP); Andreas F. Molisch, Arlington, MA (US); Zhifeng Tao, Allston, MA (US); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 661 days.

(21) Appl. No.: 12/403,025

(22) Filed: Mar. 12, 2009

(65) Prior Publication Data

US 2009/0225883 A1    Sep. 10, 2009

Related U.S. Application Data

(63) Continuation-in-part of application No. 12/358,467, filed on Jan. 23, 2009, now abandoned.

(60) Provisional application No. 61/097,093, filed on Sep. 15, 2008, provisional application No. 61/035,123, filed on Mar. 10, 2008.

(51) Int. Cl.
*H04W 4/00* (2009.01)
(52) U.S. Cl. ........ 370/328; 370/329; 370/330; 370/332; 370/334
(58) Field of Classification Search .................. 370/328, 370/329, 330, 332, 334
See application file for complete search history.

(56) References Cited

U.S. PATENT DOCUMENTS

| | | | |
|---|---|---|---|
| 6,104,930 A * | 8/2000 | Ward et al. | 455/450 |
| 6,167,286 A * | 12/2000 | Ward et al. | 455/562.1 |
| 6,307,506 B1 | 10/2001 | Despain et al. | |
| 7,230,931 B2 * | 6/2007 | Struhsaker | 370/280 |
| 7,539,274 B2 | 5/2009 | Catreux et al. | |
| 2005/0147023 A1 * | 7/2005 | Stephens et al. | 370/203 |
| 2006/0111149 A1 * | 5/2006 | Chitrapu et al. | 455/562.1 |
| 2006/0199577 A1 * | 9/2006 | Ramakrishna et al. | 455/422.1 |
| 2006/0270343 A1 * | 11/2006 | Cha et al. | 455/25 |
| 2007/0049218 A1 * | 3/2007 | Gorokhov et al. | 455/102 |
| 2007/0160156 A1 * | 7/2007 | Melzer et al. | 375/260 |
| 2008/0069058 A1 * | 3/2008 | Geng et al. | 370/336 |
| 2008/0089396 A1 * | 4/2008 | Zhang et al. | 375/220 |
| 2008/0132281 A1 * | 6/2008 | Kim et al. | 455/562.1 |
| 2008/0253297 A1 * | 10/2008 | Hulbert | 370/252 |
| 2009/0023467 A1 * | 1/2009 | Huang et al. | 455/522 |
| 2009/0046674 A1 * | 2/2009 | Gao et al. | 370/337 |
| 2009/0122777 A1 * | 5/2009 | Tao et al. | 370/343 |
| 2009/0279512 A1 * | 11/2009 | Fujishima et al. | 370/336 |
| 2010/0054200 A1 * | 3/2010 | Tsai | 370/329 |
| 2010/0173639 A1 * | 7/2010 | Li et al. | 455/450 |
| 2010/0220601 A1 * | 9/2010 | Vermani et al. | 370/248 |

FOREIGN PATENT DOCUMENTS

EP    1562306 A1 *  8/2005

* cited by examiner

*Primary Examiner* — Chi Pham
*Assistant Examiner* — Farah Faroul
(74) *Attorney, Agent, or Firm* — Dirk Brinkman; Gene Vinokur

(57) ABSTRACT

A base station transmits a set of sounding requests to a set of mobile station (MS) in a cell, using a set of beams, wherein there is one beam for each sounding request. Qualities of sounding signals transmitted by the set of MSs in response to receiving the sounding request are measured, and the set of MSs are grouped into subsets according to the qualities, wherein there is one subset of MSs associated with each beam.

12 Claims, 5 Drawing Sheets

ANALOG BEAMFORMING TO REDUCE INTERFERENCE IN WIMAX NETWORKS

RELATED APPLICATION

This Non-Provisional Patent Application, which claims priority to Provisional Application 61/097,093, "Analog Beamforming to Reduce Interference in Wimax Networks," filed by Molisch et al. on Sep. 15, 2008, is a Continuations-in-Part Application of U.S. patent application Ser. No. 12/358,467, "Analogue Beamforming, filed by Tao et al., on Jan. 23, 2009, now abandoned which claims priority to Provisional Application 61/035,123, "Analogue Beamforming," filed by Kuze et al. on Mar. 10, 2008, all assigned to Mitsubishi Electric Research Laboratories, Inc., and incorporated herein by reference.

FIELD OF THE INVENTION

This invention relates generally to wireless networks, and more particularly to analog beam forming and beam switching in networks according to the IEEE 802.16m standard.

BACKGROUND OF THE INVENTION

One object of networks designed according to the Worldwide Interoperability for Microwave Access (WiMAX) standard is to improve a spectral efficiency of networks, while keeping the cost of deployments to a minimum. Fixed WiMAX is based on the IEEE 802.16d standard, and mobile WiMAX on the IEEE 802.16e standard.

One way to do this is to use analog beam forming (ABF). The basic principle of ABF is to form a beam at a base station (BS) for each sector in the cell where the BS is located. This can be achieved with a linear antenna array concatenated with a Butler matrix, see IEEE C802.16m-08/182r3.

The BS switches through the available beams, both in the uplink (UL) and the downlink (DL), in an arbitrary sequence, and communicates, at each instant in time, with the mobile stations (MSs) located in the sectors at the respective beams are directed. Due to the beamforming gain, the range of the cell is extended, which is important, especially for BSs that are sparsely deployed, e.g., in rural areas.

ABF is not the theoretic optimal way of using multiple antenna elements. Heterodyning all the signals to and from the baseband, and digitally processing the signals can achieve a higher capacity; see U.S. Pat. No. 6,307,506, "Method and apparatus for enhancing the directional transmission and reception of information." However, ABF presents an excellent tradeoff between performance and complexity. For example, ABF can be performed with only a single radio frequency (RF) chain.

As another advantage, ABF can be combined with spatial multiplexing, and other MIMO techniques. The set of N available antennas can be partitioned into K groups of M antennas, i.e., M×K=N, so that K beams are formed. In each beam, M antenna elements are available for spatial multiplexing. When dual-polarized antennas are used, it is easily possible to use K=4, and N=2.

Interference Reduction with ABF

ABF can also be used to reduce the interference. MSs receiving different beams in the various sectors are served at different times. Therefore, if the BSs in two adjacent cells arrange the downlink and uplink transmission in such a way that the BSs do not transmit to the MSs in same sector at the same time, the interference at the MSs is greatly reduced.

If the BSs in adjacent cells can coordinate the beams, then interference from the BS in adjacent cells can be substantially reduced. If the BSs cannot coordinate, then the sequence in which beams are transmitted can be selected randomly and independently at each BS. This still leads to a stochastic reduction of the interference, similar to the reduction of interference in random frequency hopping or time-hopping impulse radio.

If ABF is to be used, the BS broadcasts that it is using sequential beamswitching, so that the MSs can take this into account for making their handover decisions. The specific switching sequence can be determined at each BS based using the base station identification (BS ID) as an initial value, i.e., a seed, to a shift register that generates the random switching sequence.

In the related Patent Application, a superframe is partitioned into multiple sequential zones, one zone for each beam. Each zone begins with a preamble. The MS selects the beam for which the signal during the preamble has a largest signal strength, and feeds back the corresponding beam index to the BS. This means the MS needs to know the number of beams the BS is using. Thus, the beamforming is not transparent to the MS. Essentially, there the grouping and beam selection is performed by the MS. It is desired to make the entire beamforming and grouping process transparent to the MS.

SUMMARY OF THE INVENTION

A method and apparatus communicate in a wireless network. The network includes a base station (BS) and a set of mobile stations (MSs) located in a cell. The base station transmits a set of sounding requests, using a set of beams, wherein there is one beam for each sounding request. Qualities of a sounding signal transmitted by the set of MSs in response to receiving the sounding request are measured, and the set of MSs are grouping into subsets according to the qualities, wherein there is one subset associated with each beam.

DETAILED DESCRIPTION OF THE PREFERRED EMBODIMENTS

Figure 1A:
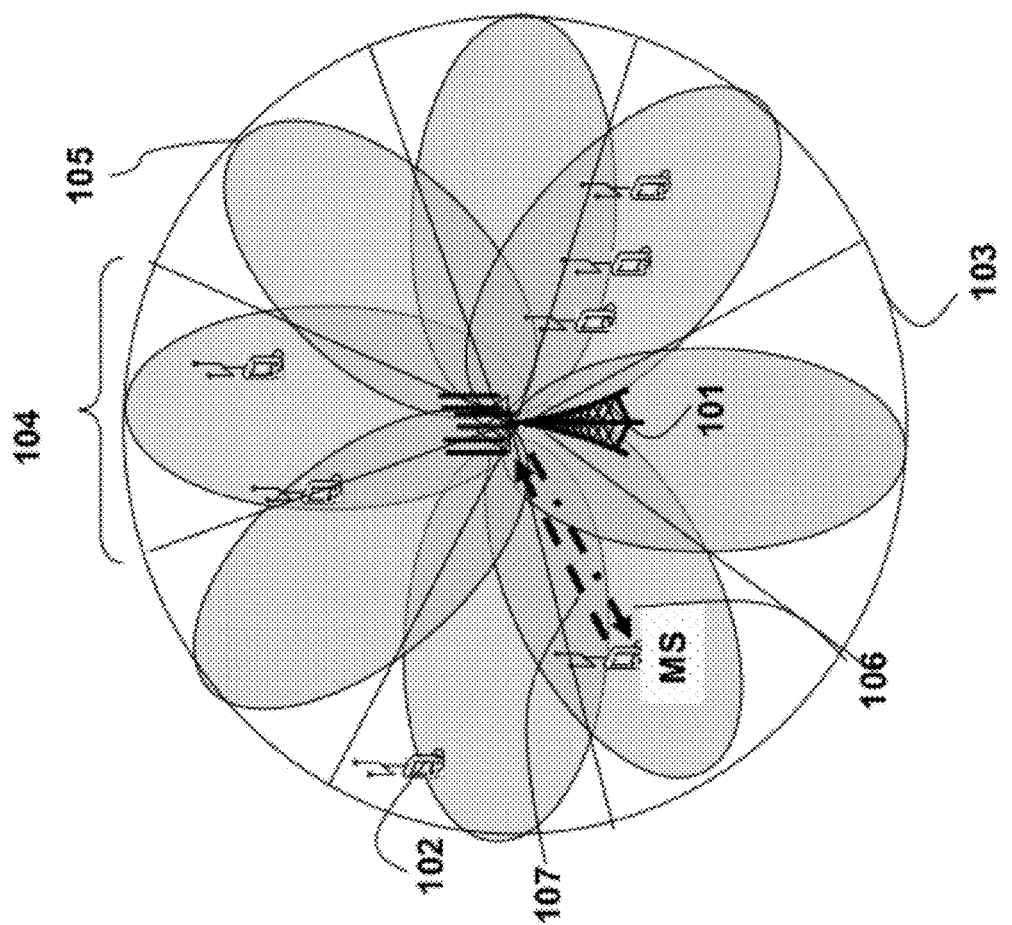
FIG. 1A is a schematic of a wireless network according to embodiments of the invention.

FIG. 1A shows a wireless network with a base station (BS) 101 in a cell 103, and a set of mobile stations (MS) 102 served by the BS according to embodiments of our invention. The BS can form beams 105 within the cell 103 using a linear antenna array concatenated with a Butler matrix, see U.S. Patent Application 20060104197, "Method and system for economical beam forming in a radio communication system," incorporated herein by reference. Typically, the beams are associated with sectors. For the example, there are eight (45°) sectors 104, and eight beams. It should be noted, that arrangement of sectors and adaptive beams can vary dynamically to adapt to network topology (coverage) and traffic conditions, such as the distribution of the MSs, and their required data rates. For example, areas of the cell with a higher concentration of MSs can be allocated a larger number of beams.

As defined herein a beam is a spatially selective, radio signal transmitted omni-directionally by an array of antennas.

Figure 1B:
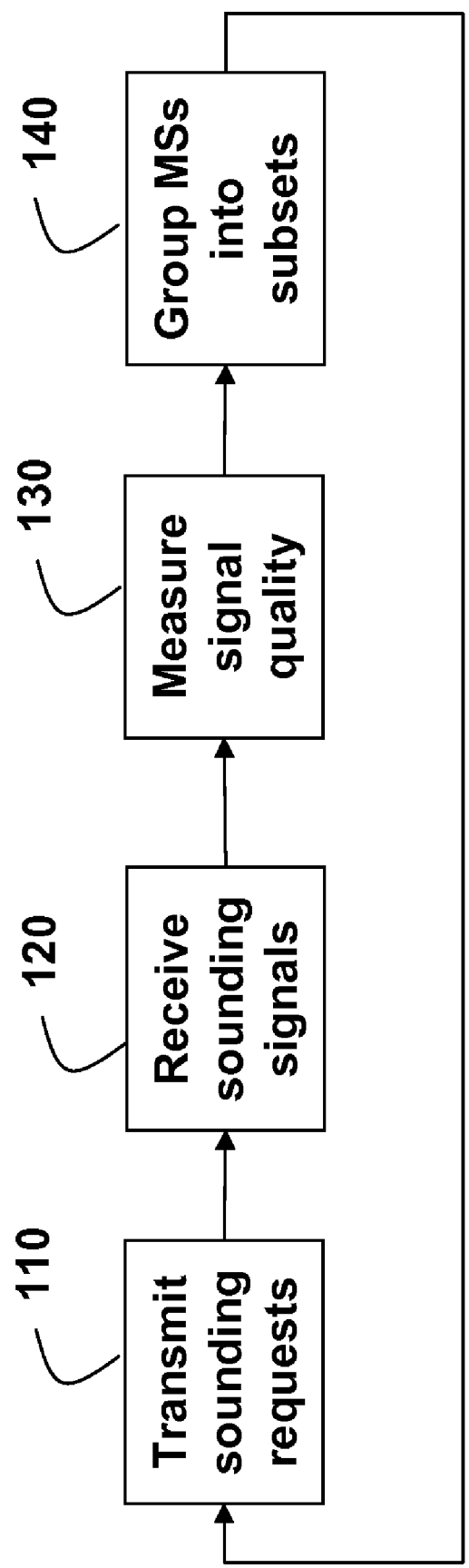
FIG. 1B is a block diagram for beam forming according to embodiments of the invention.

Within a network according to the IEEE 802.16m standard, it may not be desirable to introduce additional zones and the associated control signaling that this involves. Analog beam forming (ABF) can be implemented in a manner that is essentially transparent to the MSs. We start by assuming that network joining occurs during conventional operation, e.g., in a first Partial Usage of Subchannels (PUSC) zone the PUSC zone of a downlink (DL) subframe. Then, the BS may begin transmitting on individual beams in the remainder of the DL subframes. This is shown in FIG. 1B.

By partitioning the DL subframe into multiple zones, the MS in different zones can be handled sequentially. Each ABF zone corresponds to a transmission interval in the DL, where a particular beam is active at the BS. Thus, the MS within the same coverage area of the active beam are grouped into an active set, and served during the corresponding zones.

The embodiment of the invention enable an efficient grouping of the MS into the active sets for the corresponding beams, and then serving all MS within each active set during the same zone of the DL or UL sub-frame.

Sounding and Grouping

As shown in FIG. 1B, the BS transmits 110 sounding requests 106 on the DL channel. There is one request for each beam in a set of beams that the base station can form, e.g., eight. The request specifies a time and subchannel that the MSs are to use to transmit a sounding signal in response to receiving the request. Only the MSs that are in the beams receive the request and respond. It is noted that the MSs do not need to be aware that the request is beam formed. In other words, the invention can be applied to conventional, unmodified MSs.

The responsive sounding signals 107 are received 120 by the BS via the UL channel 107. The BS measures 130 a quality of the sounding signal. The sounding signals with a good quality are received on channels that coincide with the beams.

Then, the BS groups 140 the set of MSs into subsets corresponding to each beam based on the quality for further communication. The process can be repeated periodically, or as the network environment changes.

Frame structure for ABF

Figure 2:
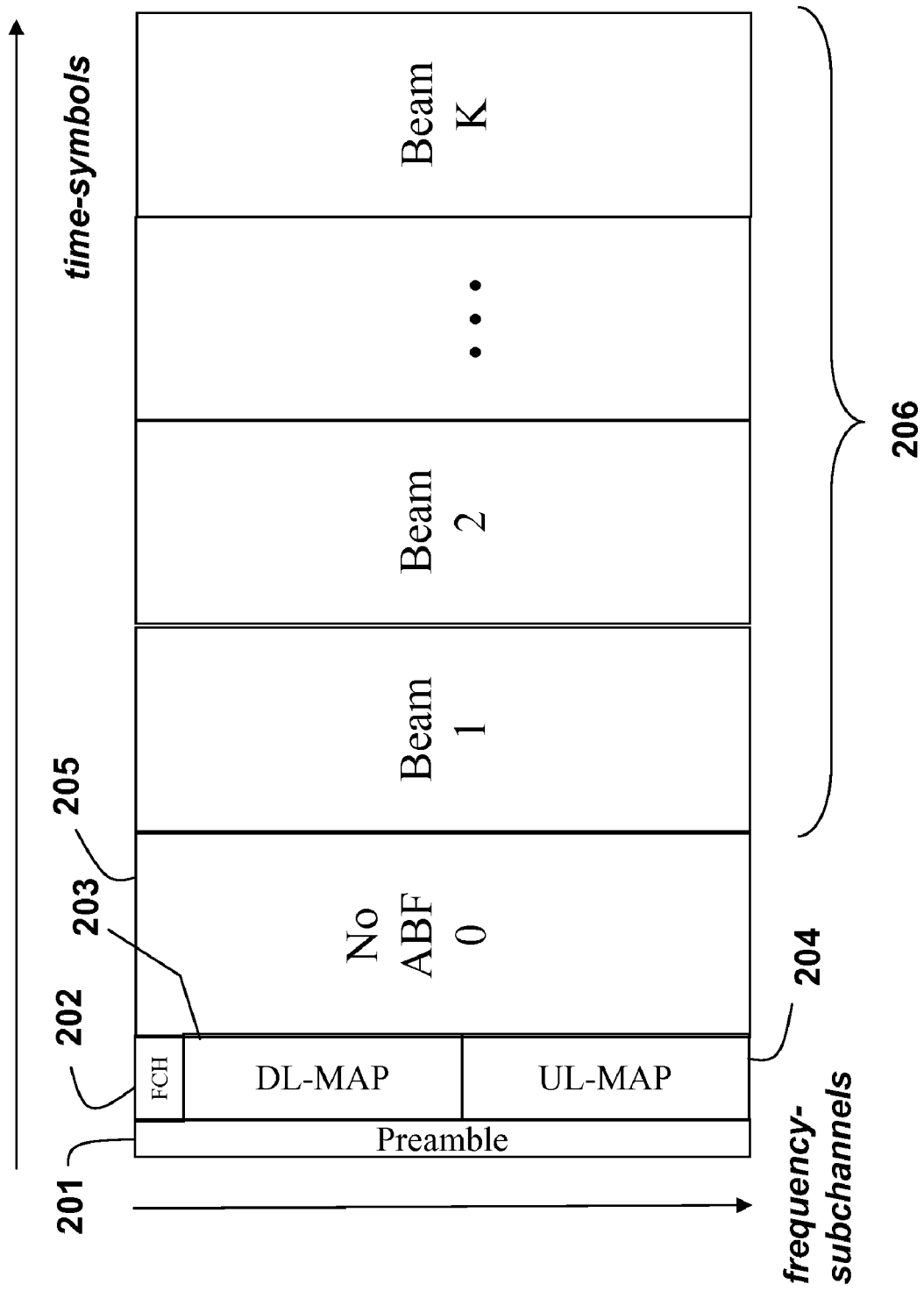
FIG. 2 is a block diagram of a downlink subframe according to embodiments of the invention.

FIG. 2 shows a DL subframe of a superframe according to embodiments of the invention. The superframe is partitioned into symbols in the time dimension, and subchannels in the frequency dimension. The number of symbols and subchannels is specified by the network. The DL subframe begins with a preamble 201, a frame control header (FCH) 202, a DL map 203 and an UL-map 204.

The BS sequentially transmits a set of beams $\{0, 1, \ldots, K\}$ 206 during the remainder of the DL frame. During the first period, "No ABF" 205 no beam is formed as indicated by "0". In one embodiment, the BS transmits the sounding request during the No ABF period 205 after the DL and UL maps. In this case, the sounding requests are not transmitted in any particular beam, e.g., they are broadcast in all directions for all MSs to receive.

The issue is to determine in which beam the MS should receive and transmit and receive, i.e., the beam schedule. Ideally, each MS is assigned the optimal beam based on the channel quality within the beam. This requires that the BS request multiple sounding signals 205 from each MS.

Figure 3:
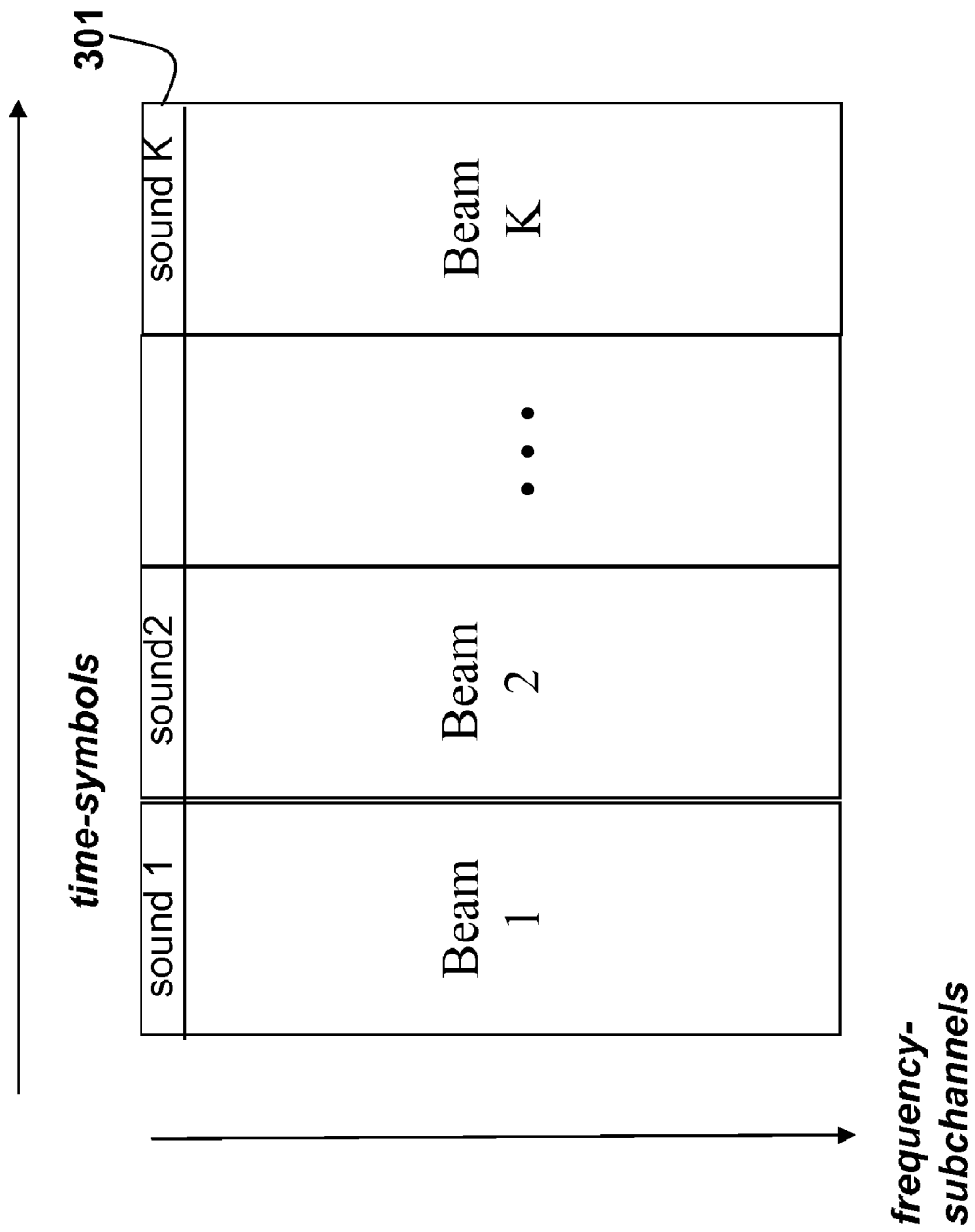
FIG. 3 is a block diagram of an uplink subframe according to embodiments of the invention.

The time and location of the sounding signals are transmitted to the MS using the UL-MAP, or other available control channels in the downlink subframe. During the uplink portion of the frame, the BS receives the sounding signals on beams $0, 1, \ldots, K$ as shown in FIG. 3.

As an advantage of the present invention, the MS does not need to be informed that the BS is beamforming. That is, the beamforming is completely transparent at the MSs.

After the BS acquires the channel quality information (CQI) from the MSs, the BS can group the set of MSs into subsets that coincide with quality beams, and further communications in both the UL and DL directions is be scheduled on the optimal beam for Each MS.

Training for ABF

It is not necessary for the MS to sound on all the possible beams. After an initial estimate of the optimal beam, the BS can request the MS only sound on adjacent beams to reduce overhead. The time that a MS stays within one beam is usually quite large, e.g., seconds, so infrequent periodic sounding of the beams is sufficient.

Performance for Training Structure for Basic Case

To test the performance enhancement achievable with ABF, we simulate a small WiMAX network. We consider the down link case, and the average signal to interference and noise ratio (SINR) cumulative distribution function (CDF) at the MS. To generate the CDF, a MS is randomly located in a sector of interest. We assume that the MS communicates on the optimal available beam from the base station. The base station may communicate on set of $N_B$ beams, where $N_B$ is assumed to be either four or eight.

The receiver noise is assumed to be additive white Gaussian (AWG). The SINR is determined at a thousand random locations within the sector. At each location five channel realizations are averaged to determine the SINR at each location. Other simulation assumptions are in Table 1.

TABLE

| Fast Fourier Transform size | 1024 |
| Bandwidth | 10 MHz |
| Channel model | Urban Macro |
| Center Frequency | 2.5 GHz |
| Inter site distance | 1000 m |
| Thermal noise | −203 dBW/Hz |
| Receiver Noise Figure | 7 dB |

Figure 4:
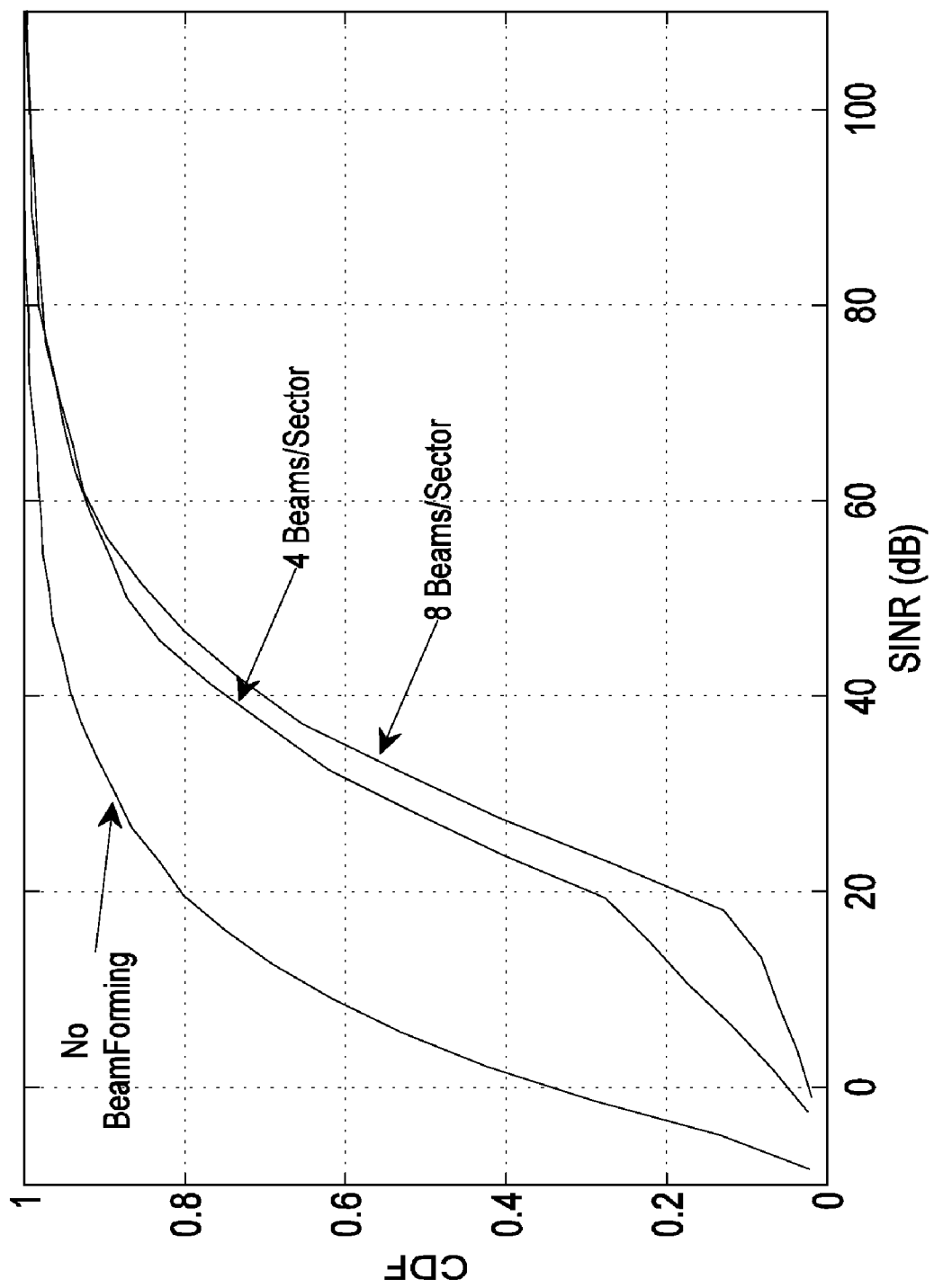
FIG. 4 is a graph comparing networks with and without beam forming.

The results are shown in FIG. 4, and we see significant improvement in the SINR over the case without ABF. For a four beam network the gain is approximately 4-5 dB at the median of the CDF. An additional 3 dB gain can be achieved with eight beams.

Effect of the Invention

The invention provides a simple but extremely efficient method for increasing SINR, and thus throughput in WiMAX networks. The method is not the optimum way of exploiting multiple antenna elements. A four-beam switching network cannot perform as well as a full four-antenna MIMO networks. However, the complexity of a four-beam switching network is much lower than a four-antenna MIMO network.

The complexity is identical to that of a single-antenna network with a single FRF chain, and just an additional switch and antennas. Beam switching provides a low-cost and efficient solution both for range extension and for interference reduction.

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

We claim:

1. A method for communicating in a wireless network including a base station (BS) and a set of mobile stations (MSs) located in a cell, comprising the base station performing steps of the method, comprising the steps of:
   specifying a time and a subchannel for transmitting at least one sounding signal in a uplink map of a downlink subframe of a superframe, wherein the superframe includes the downlink subframe and an uplink subframe and the downlink subframe further includes a downlink map and an uplink map;
   broadcasting a set of sounding requests using a set of beams after the downlink map and the uplink map during a period when no beams are formed in the downlink subframe, wherein there is one beam for each sounding request;
   measuring qualities of sounding signals transmitted by the set of MSs in response to receiving the set of sounding requests; and
   grouping the set of MSs into subsets according to the qualities, wherein there is one subset associated with each beam.

2. The method of claim 1, wherein the wireless network uses orthogonal frequency division multiple access.

3. The method of claim 1, wherein the wireless network operates according to IEEE 802.16d or IEEE 802.16e standards.

4. The method of claim 1, further comprising:
   adapting the set of beams to a topology and traffic of the wireless network.

5. The method of claim 1, wherein a superframe includes a downlink subframe and an uplink subframe and the downlink subframe further includes a downlink map and an uplink map, and further comprising:
   specifying a time and a subchannel for transmitting at least one sounding signal in the uplink map of the downlink subframe of a superframe.

6. The method of claim 5, further comprising:
   partitioning the downlink subframe into a set of sequential zone, wherein there is one zone for each beam.

7. The method of claim 5, further comprising:
   partitioning the uplink subframe of the superframe into a set of sequential zone, wherein there is one zone for each beam.

8. The method of claim 5, wherein the set of sounding requests are broadcast after the downlink map and the uplink map during a period when no beams are formed downlink subframe.

9. The method of claim 1, further comprising:
   selecting the beams sequentially.

10. The method of claim 9, further comprising:
    requesting the MSs to only transmit sounding signals on beams adjacent to a selected optimal beam.

11. The method of claim 1, further comprising:
    selecting the beams randomly.

12. The method of claim 1, further comprising:
    transmitting data to the subsets of the MSs using the associated beams.

* * * * *